UNITED STATES PATENT OFFICE.

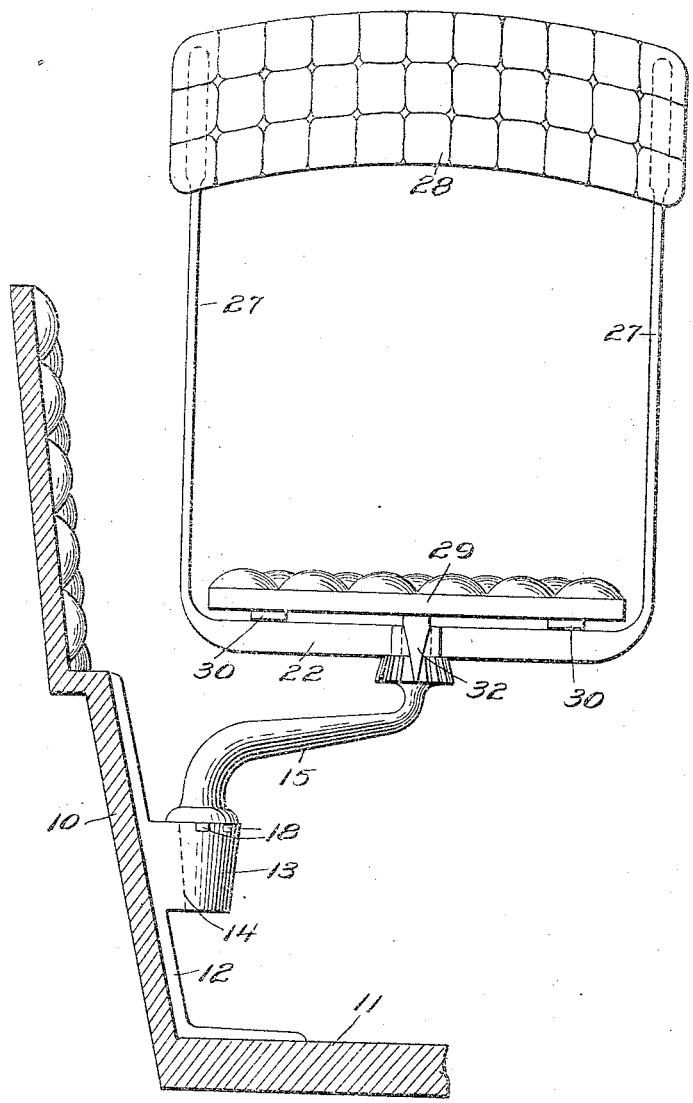

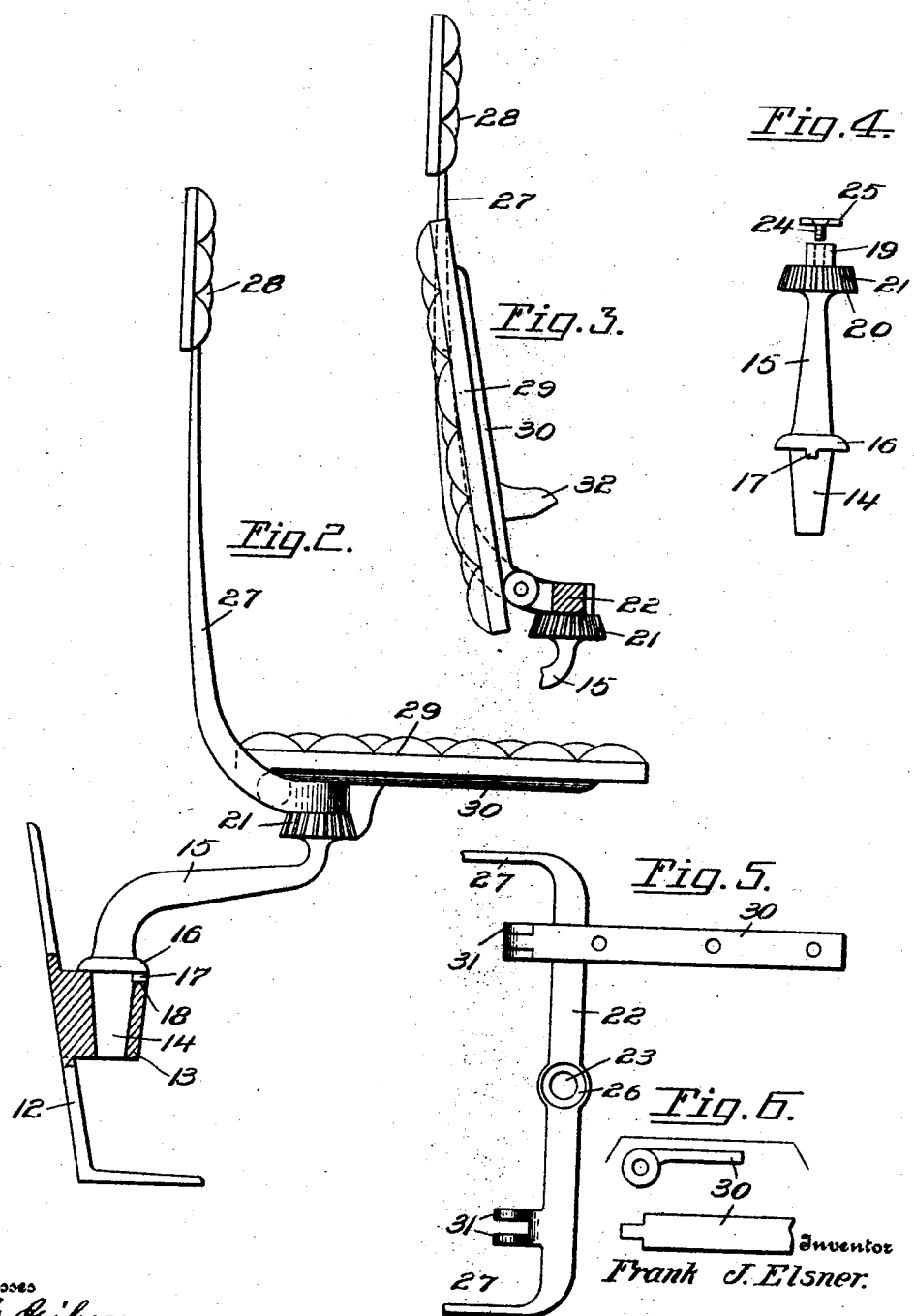

FRANK J. ELSNER, OF RACINE, WISCONSIN.

VEHICLE-SEAT.

941,983.

Specification of Letters Patent.

Patented Nov. 30, 1909.

Application filed June 30, 1908. Serial No. 441,070.

*To all whom it may concern:*

Be it known that I, FRANK J. ELSNER, a citizen of the United States of America, residing at Racine, in the county of Racine and State of Wisconsin, have invented new and useful Improvements in Vehicle-Seats, of which the following is a specification.

This invention relates to vehicle seats, and more particularly an auxiliary seat for automobiles to increase the seating capacity thereof.

The object of this invention is to provide an adjustable auxiliary seat which may be swung around so that the occupant thereof can face in any direction, and also one which can be adjusted so that it may be occupied without crowding the other passengers.

A further object of the invention is to provide an auxiliary seat which, when not in use, can be folded up and swung out of the way so as not to obstruct the interior of the automobile body.

In the accompanying drawings, Figure 1 is a sectional view of one side of an automobile body showing the application of the invention. Fig. 2 is an elevation showing the seat in another position. Fig. 3 is an elevation, partly in section and broken away, showing the seat folded. Fig. 4 is an elevation of the seat supporting-arm. Fig. 5 is a plan view of a portion of the seat-frame. Fig. 6 is a detail of one of the hinge members hereinafter referred to.

Referring more particularly to the drawings, 10 designates the side, and 11 the floor of an automobile body to which, between the front and rear seats, (not shown) is secured an angular plate 12 formed with a socket-piece 13 to receive a pintle 14 in the supporting arm 15 of the seat. The pintle turns freely in the socket in order that the arm 15 may be swung close to the side 10 of the automobile body, or to be extended at various angles therefrom. The pintle 14 is formed with a collar 16 which engages the top of the socket-piece 13, and on the bottom of the collar is a lug 17 which is adapted to enter one of a number of notches 18 in the top of the socket-piece for holding the arm 15 at adjustment. Upon lifting the arm so as to disengage the lug from the notch, the arm can be swung in the desired direction, and upon lowering it and entering the lug in the notch corresponding to the desired adjustment, the arm will be securely held in adjusted position.

At the extremity of the arm 15 is a stud 19 on which the seat is swiveled, and below the stud, the arm is formed with a collar 20 having a notched periphery 21 which is for a purpose to be presently described. The seat-frame is a cross bar 22 having at the middle an opening 23 to receive the stud 19 whereby the seat is pivotally mounted on the arm 15 for angular movement in a horizontal plane. A screw 24 passing through a washer 25 and into the stud fastens the parts together. The washer 25 fits in a circular recess 26 in the top of the cross-bar. From the ends of the cross-bar extend upwardly the side-arms 27 of the seat to the upper ends of which is secured the back-rest 28.

The bottom, or seat proper is indicated at 29. To the under side thereof are secured hinge-straps 30 which are connected to knuckles 31 on the cross-bar 22 whereby a hinge-connection between the bottom and the cross-bar is had. From the under side of the bottom 29 projects a finger 32 which, when said bottom is in lowered position, is engageable with one of the notches of the collar 20 for holding the seat at adjustment. Upon raising the bottom, the seat is free to be swung around on the stud 19, and when the bottom is lowered, the finger enters one of the notches and thereby holds the seat in adjusted position.

The seat herein described is simple in construction, it can be attached to the automobile body without altering or modifying the structure thereof, and it can be readily adjusted to various positions. By swiveling the supporting arm 15 as well as the seat, a wide range of adjustment is had, and the seat can be swung around so that the occupant thereof may face in any direction, and it can also be adjusted so that it may be occupied without crowding the other passengers. Fig. 1 shows the seat swung in a position to face the rear seat, and Fig. 2 shows it swung to face the opposite side of the automobile body. When the seat is not in use, the bottom 29 is folded as shown in Fig. 3 and the arms 15 swung toward the side wall 10 of the automobile body, the seat-frame being swung so as to extend alongside the same. In this position the seat is out of the way and does not obstruct the interior of the automobile body.

I claim:

A supplemental seat for automobiles comprising in combination, a supporting bracket having a vertical socket, a seat-supporting arm having a vertical pintle at one end slidably fitted and journaled in said socket and having means to interlock therewith to prevent the arm from turning, an upwardly extending stud at the other end of said arm, a collar at the base of said stud having the periphery thereof notched, a hinged seat embodying a bottom cross bar having a central opening receiving said stud whereby the seat may be turned around said stud as a center, and a locking finger on the seat bottom adapted to engage any one of the notches of said collar when the seat is lowered.

In testimony whereof I affix my signature in presence of two witnesses.

FRANK J. ELSNER.

Witnesses:
   PETER NELSON,
   BERNHART LARSON.